United States Patent [19]

Kain

[11] Patent Number: 5,615,925
[45] Date of Patent: Apr. 1, 1997

[54] ARTICLE HOLDER FOR CHILD SEAT

[75] Inventor: James M. Kain, Tipp City, Ohio

[73] Assignee: Cosco, Inc., Columbus, Ind.

[21] Appl. No.: 534,233

[22] Filed: Sep. 26, 1995

[51] Int. Cl.⁶ .......................................................... B60N 2/28
[52] U.S. Cl. .................. 297/188.01; 297/188.2; 297/256.15; 224/926
[58] Field of Search .................. 297/188.01, 188.14, 297/188.18, 188.2, 250.1, 256.15; 248/311.2; 224/926

[56] References Cited

U.S. PATENT DOCUMENTS

| | | |
|---|---|---|
| 185,555 | 12/1876 | Lindsay . |
| D. 283,855 | 5/1986 | Kujawski . |
| D. 291,032 | 6/1987 | Sauter et al. . |
| D. 297,287 | 8/1988 | Lopez . |
| D. 307,834 | 5/1990 | Sudoh et al. . |
| D. 315,253 | 3/1991 | Kain . |
| D. 324,611 | 3/1992 | Sedlack . |
| D. 330,639 | 11/1992 | Munro et al. . |
| D. 330,842 | 11/1992 | Meeker et al. . |
| D. 339,477 | 9/1993 | Kain . |
| 2,544,896 | 3/1951 | Nidetch et al. . |
| 2,759,529 | 8/1956 | Hagadorn . |
| 2,792,055 | 5/1957 | O'Neil . |
| 3,094,355 | 6/1963 | Pedro . |
| 3,563,600 | 2/1971 | Converse . |
| 3,675,969 | 7/1972 | Gage .................. 297/188.18 |
| 4,191,420 | 3/1980 | Fassett et al. . |
| 4,474,407 | 10/1984 | Nazar . |
| 4,500,059 | 2/1985 | Papizan .................. 297/188.2 X |
| 4,521,052 | 6/1985 | Cone . |
| 4,527,830 | 7/1985 | Meyers .................. 297/188.11 X |
| 4,643,474 | 2/1987 | Wise et al. . |
| 4,671,574 | 6/1987 | Kassai . |
| 4,711,490 | 12/1987 | Brand . |
| 4,754,999 | 6/1988 | Kain . |
| 4,765,685 | 8/1988 | Sudoh et al. . |
| 4,801,060 | 1/1989 | Thompson .................. 224/926 X |
| 4,834,420 | 5/1989 | Sankrithi et al. . |
| 4,927,200 | 5/1990 | Wilkins .................. 297/188.2 X |
| 4,951,997 | 8/1990 | Kenney . |
| 4,962,965 | 10/1990 | Glover . |
| 4,984,845 | 1/1991 | Knoedler et al. . |
| 5,061,012 | 10/1991 | Parker et al. . |
| 5,181,761 | 1/1993 | Meeker . |
| 5,183,311 | 2/1993 | Meeker et al. . |
| 5,213,393 | 5/1993 | Maurer et al. . |
| 5,230,523 | 6/1993 | Wilhelm . |
| 5,275,464 | 1/1994 | Eichhorn et al. . |
| 5,286,084 | 2/1994 | Bart . |
| 5,332,286 | 7/1994 | Atherton et al. .................. 297/188.14 X |
| 5,358,307 | 10/1994 | Shafer et al. .................. 297/188.01 X |
| 5,507,558 | 4/1996 | Kain .................. 297/256.15 |

FOREIGN PATENT DOCUMENTS

| | | |
|---|---|---|
| 3313870A1 | 10/1984 | Germany . |
| 3409449 | 10/1984 | Germany .................. 297/188.21 |

OTHER PUBLICATIONS

Fisher–Price Juvenile Products Catalog, 1992, p. 4.
Century Products Catalog, Nov. 1995, pp. 15 and 16.
Gerry Products Catalog, Oct. 1994, pp. 10 and 11.
Evenflo Products Catalog, Oct. 1994, p. 11.

*Primary Examiner*—Peter R. Brown
*Attorney, Agent, or Firm*—Barnes & Thornburg

[57] ABSTRACT

A child seat includes a seat, an article holder, and a mechanism that connects the article holder to the seat. The seat includes a left side wall, a right side wall positioned to lie in spaced-apart relation to the left side wall, and a seat bottom therebetween. One of the left and right side walls includes an inner panel abutting the seat bottom, an outer panel spaced apart from and connected to the inner panel, and a downwardly-opening, article holder-receiving mounting chamber defined between the inner panel and outer panel. The inner panel includes a bottom edge and the outer panel includes a bottom edge that is vertically spaced from the bottom edge of the inner panel to define a side access port into the downwardly-opening, article holder-receiving mounting chamber. The mechanism that connects the article holder to the seat positions the article holder adjacent to the side access port.

43 Claims, 4 Drawing Sheets

ARTICLE HOLDER FOR CHILD SEAT

BACKGROUND AND SUMMARY OF THE INVENTION

This present invention relates to a child seat for use in a vehicle, and particularly to a child seat having an article holder. More particularly, the present invention relates to an article holder mounted to a child seat and configured to hold items needed by a caregiver and child.

Child seats are often used in vehicles to provide seats for children. Typically, a child seat includes a seating surface for the child and a pivotable barrier shield movable relative to the seating surface to a position retaining the child in a seated position on the seating surface. Many barrier shields are formed to receive vehicle lap belts so that the lap belt can be used to retain the child seat and its barrier shield in a selected position on an underlying regular vehicle seat. One well-known child seat is the EXPLORER® brand seat made by Cosco, Inc. of Columbus, Ind. and disclosed, for example, in U.S. Pat. No. Des. 291,032. Child seats are also disclosed, for example, in U.S. Pat. Nos. 5,275,464; 4,521,052; 4,754,999; 5,183,311; 4,643,474; 4,671,574; and 4,765,685; and in U.S. Pat. Nos. Des. 330,842; 324,611; and 307,834.

A child seat configured to hold cups or other articles for children seated in the child seat would be welcomed by consumers. A child seat having an article holder would be convenient both for children and their caregivers.

According to the present invention, a child seat is provided for seating a child in a selected place. The child seat includes a seat having left and right side walls and a seat bottom positioned therebetween. An article holder or cup holder is mounted to the seat along one of the left and right side walls.

In preferred embodiments of the present invention, the side-mounted cup holder moves with the child seat as the seat is moved between seats in a vehicle or between vehicles. The side-mounted cup holder remains accessible to the children sitting in the child seat and their caregivers no matter where the child seat is placed.

Several cavities are formed in the cup holder for holding miscellaneous items of the children sitting in the child seat and their caregivers. One cavity formed in the cup holder is substantially round in shape to provide a secure and convenient location for caregivers and children to place bottles, cups, and juiceboxes. Another triangularly-shaped cavity is formed in the cup holder to receive other miscellaneous items.

The seat is formed to include a downwardly-opening, cup holder-receiving mounting chamber formed in the left side wall. The mounting chamber provides a mounting location for the cup holder that is hidden behind the left side wall. The cup holder also includes a mounting portion having spaced-apart mounting brackets that extend into the mounting chamber. To assemble the cup holder onto the seat, the mounting brackets are placed in the mounting chamber and screws connect the mounting brackets to the seat to position the cup holder adjacent to the left side wall.

The cup holder includes a hidden-from-view mounting portion and the seat includes a hidden-from-view mounting chamber so that the mounting location for the cup holder and seat is hidden and thus the screws are hidden within the mounting chamber behind the left side wall. When the cup holder is removed from the seat, the child seat retains its aesthetically pleasing appearance because the mounting location is hidden. In addition, the article holder is shaped to match the contours of the seat so that the child seat maintains its aesthetically-pleasing appearance when the article holder is mounted to the seat.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2:
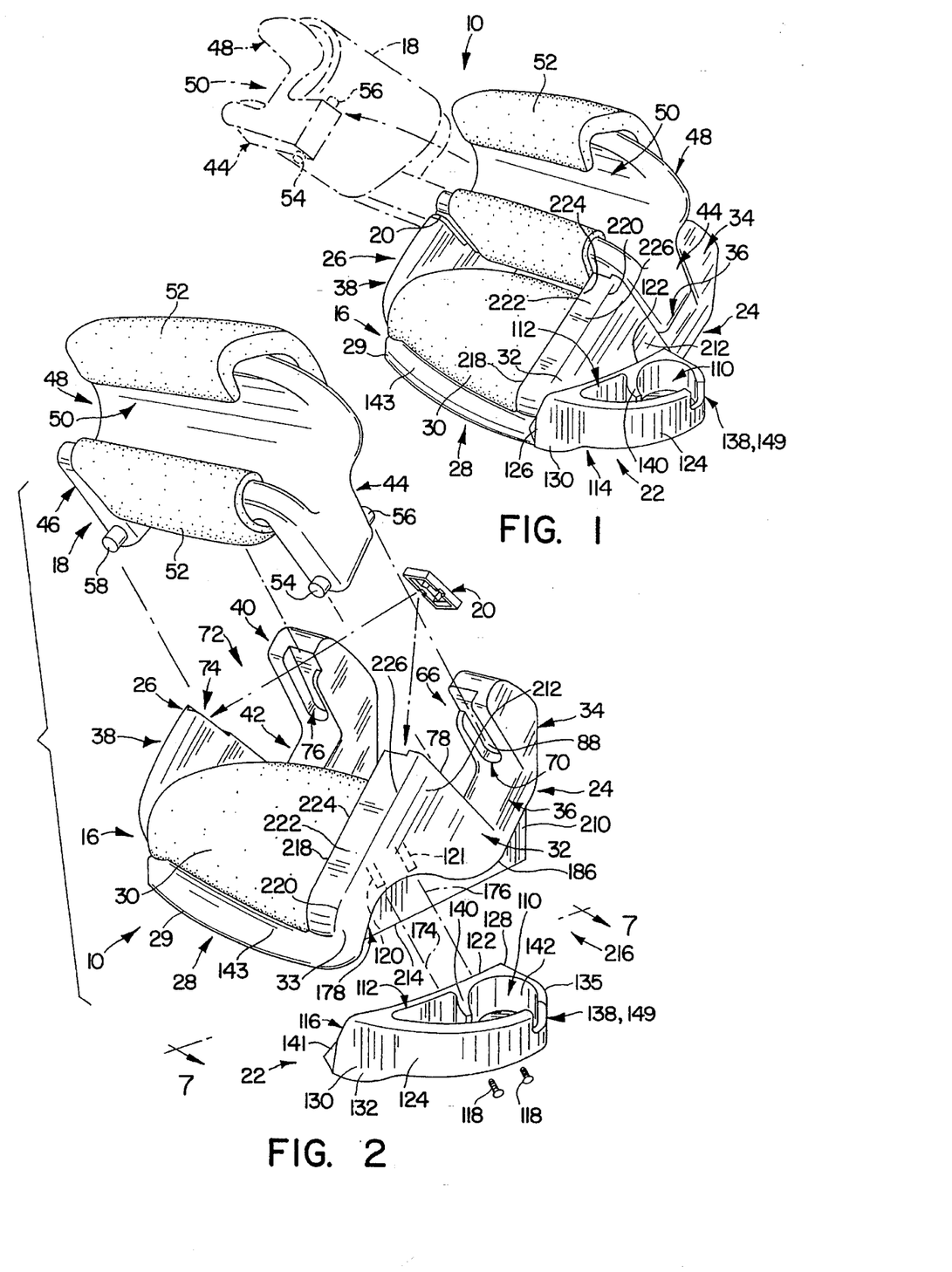
FIG. 1 is a perspective view of a child seat according to the present invention showing a seating unit, a shield movable relative to the seating unit from a closed position (solid lines) to an opened position (phantom lines), and a side-mounted article holder attached to a left side of the seating unit.
FIG. 2 is an exploded assembly view of the child seat of FIG. 1 showing the seating unit, the shield prior to insertion into the seating unit, a small shield lock plate that can be mounted on either a left or right side wall of the seating unit to control the pivot-opening direction of the shield relative to the seating unit, the side-mounted article holder, a hidden-from-view mounting chamber (shown in phantom) formed in the left side wall, and connectors for coupling the article holder to the left side wall of the seating unit.

A child seat 10 for seating a child (not shown) in a selected place is shown in FIG. 1. Child seat 10 is configured so that it can be held in place on a vehicle seat 12 using a vehicle lap belt 14 as shown, for example, in FIG. 6, to retain a child in a seated position. A side-mounted article holder or cup holder 22 is mounted to seating unit 16 as shown in FIGS. 1 and 6 to provide a convenient place for a caregiver or an occupant of child seat 10 to store cups or other articles alongside seating unit 16. Article holder 22 is a modular unit separate from seating unit 16 in the illustrated embodiment. Article holder 22 is easily mounted to seating unit 16 as shown, for example, in FIGS. 2–5. A downwardly-opening article holder-receiving mounting chamber 178 is formed in child seat 10 to provide a hidden-from-view mounting location for article holder 22 to attach to child seat 10.

Referring to FIGS. 1 and 2, child seat 10 includes a seating unit 16, a movable shield 18 for engaging seating unit 16, and a shield lock plate 20 for mounting in selected places on seating unit 16 to control, govern, and limit movement of shield 18 relative to seating unit 16. Child seat 10 further includes a bottom side 27, front side 29, and back side 31.

As shown in FIGS. 1 and 2, seating unit 16 includes left side wall 24, right side wall 26, and a seat bottom 28 therebetween. A seat pad 30 is mounted on seat bottom 28 to comfort a child seated thereon. Left side wall 24 includes a left shield support 32 appended to seat bottom 28, a left arm rest 34, and an arm rest support 36 interconnecting left shield support 32 and left arm rest 34. Also, right side wall 26 includes a right shield support 38 appended to seat bottom 28 and arranged in spaced-apart relation to left shield support 32 to locate seat pad 30 therebetween. Right side wall 26 further includes right arm rest 40 and an arm rest support 42 interconnecting right shield support 38 and right arm rest 40. In a preferred embodiment, seating unit 16 is a one-piece injection-molded unit made of a plastics material such as polypropylene or polypropylene co-polymer.

As shown in FIGS. 1 and 2, shield 18 includes a left wing 44, a right wing 46 arranged to lie in spaced-apart parallel relation to left wing 44, and an elongated barrier 48 positioned to interconnect forward ends of left and right wings 44, 46. Barrier 48 is formed to include a forwardly opening, horizontally extending channel 50 for receiving a vehicle lap belt 14 therein as shown, for example, in FIG. 6. Thus, a vehicle lap belt 14 can be used to hold child seat 10 in a selected place on a vehicle seat 12. A barrier pad 52 is mounted on barrier 48 to comfort a child seated in seating unit 16.

A pair of left pivot posts 54, 56 is appended to left wing 44 on movable shield 18 and a pair of right pivot posts 58, 60 is appended to right wing 46 on movable shield 18 as shown, for example, in FIGS. 2 and 6. In the illustrated embodiment, these pivot posts 54, 56, 58, 60 are integrally formed on movable shield 18.

Shield 18 is configured to slidably and pivotably engage seating unit 16 in the manner shown in the drawings. Seating unit 16 is formed to include various slots for receiving left wing 44 and its pivot posts 54, 56 and right wing 46 and its pivot posts 58, 60 so that shield 18 is pivotable relative to seating unit 16 in the manner shown, for example, in FIG.

1. Shield 18 is pivotable relative to seating unit 16 to provide a child with easy left-side or right-side access to child seat 10. Shield 18 is also slidable relative to seating unit 16 to snugly accommodate children of varying sizes in child seat 10 when child seat 10 is properly installed in vehicle seat 12.

Left side wall 24 of seating unit 16 is formed to include left wing-receiving slot 66 and a left pair of opposing, spaced-apart, post-receiving slots 68, 70. Right side wall 26 is formed to include right wing-receiving slot 72 and a right pair of opposing, spaced-apart, post-receiving slots 74, 76. These slots are shown, for example, in FIGS. 2, 3, and 6.

Left wing 44 is sized and shaped to fit into left wing-receiving slot 66 as shown in FIGS. 1 and 2. Left pivot posts 54, 56 are sized, shaped, and located to slide into the two post-receiving slots 68, 70 formed in left side wall 24 during insertion of left wing 44 on shield 18 into left wing-receiving slot 66 in left side wall 24. Right wing 46 is sized and shaped to fit into right wing-receiving slot 72 as shown in FIGS. 1 and 2. Right pivot posts 58, 60 are sized, shaped, and located to slide onto the two post-receiving slots 74, 76 formed in right side wall 26 during insertion of right wing 66 into right wing-receiving slot 72 in right side wall 26.

Movable shield 18 is easily installed on seating unit 16 in the manner shown in FIG. 2. Left wing 44 on shield 18 is inserted into the matching left wing-receiving slot 66 formed in left side wall 24 at the same time that right wing on shield 18 is inserted into the matching right wing-receiving slot 72 formed in right side wall 26. At about the same time, lower left pivot post 54 is inserted into the lower left post-receiving slot 68 formed in left shield support 32, upper left pivot post 56 is inserted into the upper left post-receiving slot 70 formed in left arm rest 34, lower right pivot post 58 is inserted into the lower right post-receiving slot 74 formed in right shield support 38, and upper right pivot post 60 is inserted into the upper right post-receiving slot 76 formed in right arm rest 40. By having the hinging pins (pivot posts) 54, 56, 58, 60 on the shield, it gives a wider contact point which increases the stability and reduces the susceptibility to torsional loading.

As shown in FIGS. 1 and 2, the slots formed in left and right side walls 24, 26 are set at an angle relative to a horizontal plane supporting seating unit 16 to enable a user to "drop" shield 18 into engagement with seating unit 16. The angled slots function to guide the left and right wings 44, 46 on gravity-fed shield 18 toward arm rest supports 36, 42 and into engagement with a child seated in seating unit 16 as shown, for example, in FIGS. 1 and 2.

Figure 3:
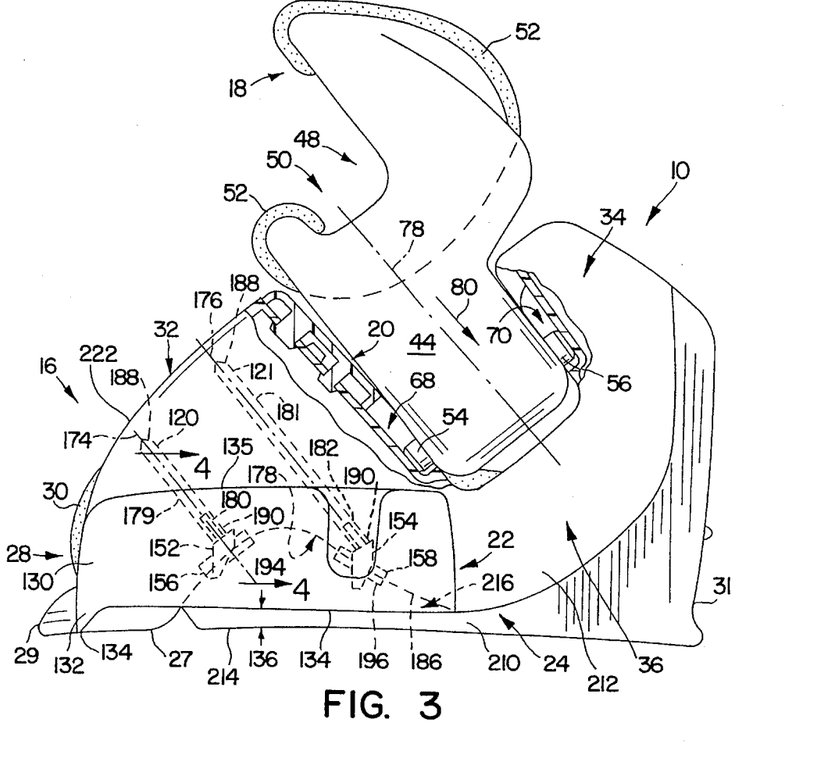
FIG. 3 is a left-side elevational view of the child seat of FIG. 1, with portions broken away, showing the article holder coupled to spaced-apart longitudinally-extending mounting fixtures (shown in phantom) formed in the hidden-from-view mounting chamber (shown in phantom)

Once installed in seating unit 16, movable shield 18 is slidable and reciprocable relative to seating unit 16 along axis 78 shown in FIG. 3. Thus, children of various sizes and shapes are accommodated easily in child seat 12 because of movable shield 18. The weight of shield 18 applies a force urging shield 18 in direction 80 along axis 78 as shown in FIG. 3 to cause the shield 18 to move automatically to engage snugly the abdomen of any small or large child seated in child set 10 as shown, for example, in FIG. 6. Also, vehicle lap belt 14, when tightened, acts to supplement the shield weight force just described and apply a second force urging shield 18 in direction 80 along axis 78. Such forces, when applied to movable shield 18, assist in maintaining shield 18 in snug engagement against the abdomen of a child seated in child seat 10 so as to assist in retaining the child in child seat 10 during vehicle impact.

Child seat 10 can be set up easily by a user to allow shield 18 to be pivoted relative to seating unit 16 in either a clockwise direction (not shown) or a counterclockwise direction 112 as shown in FIG. 1. This feature makes it easy for a user to facilitate left-side access to seating unit 16 and right-side access to seating unit 16. The position of shield lock plate 20 dictates whether shield 18 rotates in the clockwise direction (not shown) or counterclockwise direction 112 as shown in FIG. 1.

Figure 4:
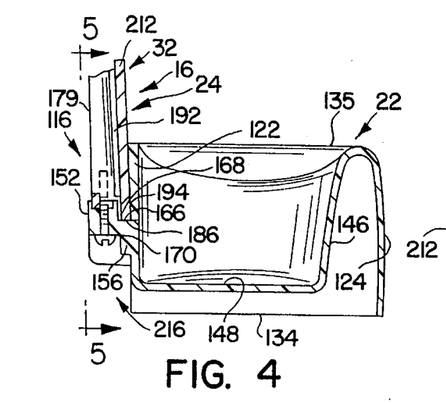
FIG. 4 is a sectional view taken along line 4—4 of FIG. 3 showing a portion of a mounting fixture in the mounting chamber, a mounting bracket formed on the article holder, and a connector extending through the mounting bracket into the mounting fixture to couple the article holder to the seat.
Figure 5:
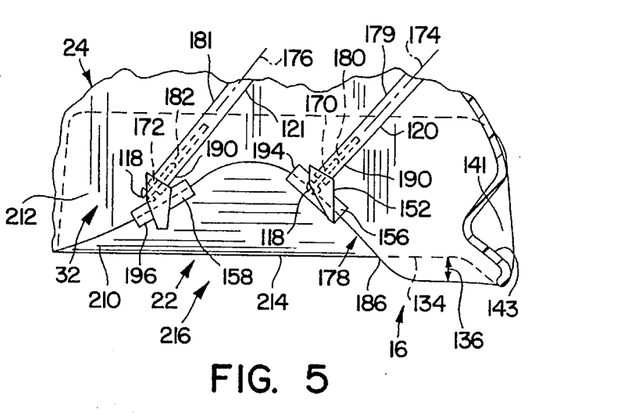
FIG. 5 is a sectional view taken along line 5—5 of FIG. 4 showing two connectors coupling two spaced-apart mounting brackets on the article holder to two spaced-apart mounting fixtures in the hidden-from-view mounting chamber.
Figure 6:
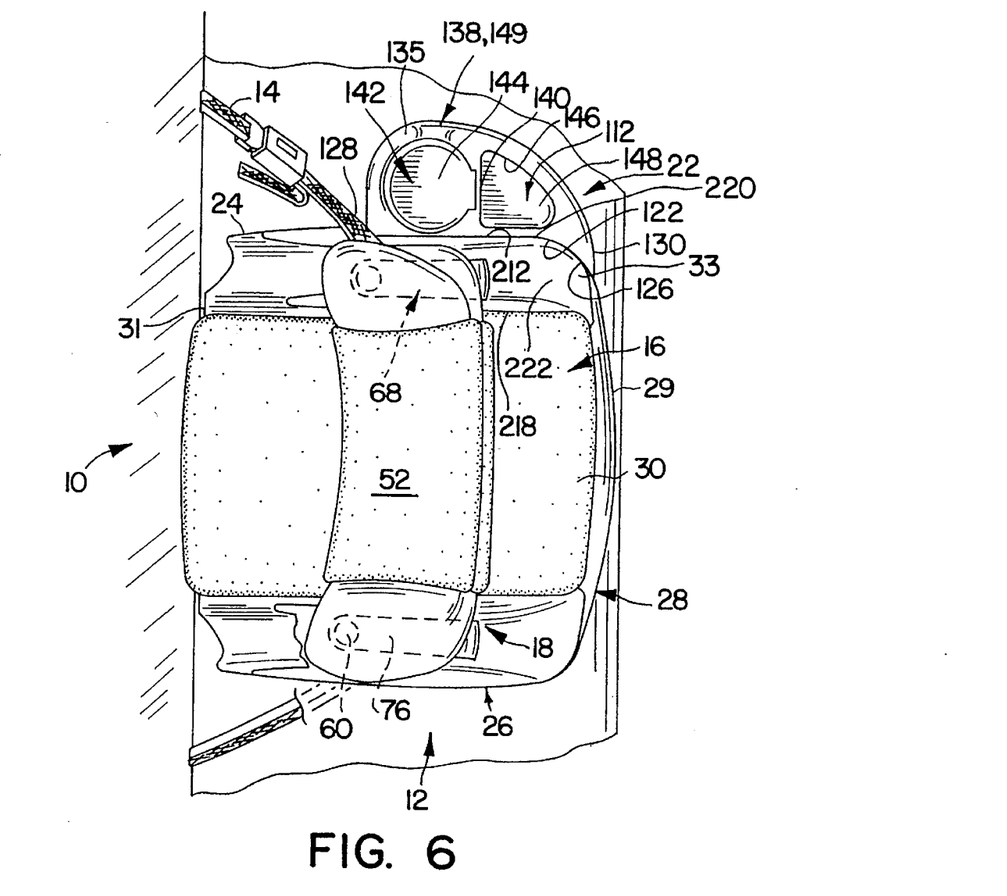
FIG. 6 is a plan view of the child seat of FIG. 1 lying in position on a vehicle seat and showing a round cup-receiving cavity formed in the article holder for holding cups, bottles, juice boxes, etc. and an oblong article-receiving cavity formed in the article holder adjacent to the cup-receiving cavity for holding miscellaneous items needed by a caregiver and a child.

Left side wall 24 includes an inner panel 210 abutting seat bottom 28, an outer panel 212 spaced apart from and connected to inner panel 210, and downwardly-opening, article holder-receiving mounting chamber 178 defined between inner panel 210 and outer panel 212 as shown, for example, in FIGS. 2, 3, and 5. Inner panel 210 includes a bottom edge 214 and outer panel 212 includes a bottom edge 186 that has a serpentine-shaped curved contour and is vertically spaced apart from bottom edge 214 of inner panel 210 as shown, for example, in FIGS. 2, 3, and 5. The vertically spaced apart bottom edges 214, 186 of inner and outer panels 210, 212 define a side access port 216 into downwardly-opening, article holder-receiving mounting chamber 178 as shown, for example, in FIGS. 2–5. Inner panel 210 includes a top edge 218 spaced apart from bottom edge 214 of inner panel 210 and outer panel 212 includes a top edge 220 spaced apart from bottom edge 186 of outer panel 212 as shown, for example, in FIGS. 1 and 2. Left side wall 24 further includes a forwardly-facing panel 222 having a first side 224 connected to top edge 218 of inner panel 210 and a second side 226 connected to top edge 220 of outer panel 212 as shown, for example, in FIGS. 1 and 2.

Side-mounted article holder 22 is mounted along outer panel 212 of left side wall 24 as shown in FIGS. 1–5 to provide a convenient place to hold cups or other articles (not shown) within reach of a child seated in child seat 10. Article holder 22 includes one or more receptacles such as cup-receiving cavity 110 and article-receiving cavity 112. These cavities 110, 112 are formed in article-receiving portion 114 of article holder 22. Article holder 22 also includes a bottom side 134, top side 135, and mounting portion 116 appended to article-receiving portion 114 and configured to mount to one of the side walls 24, 26. Fasteners or connectors 118 are provided for coupling mounting portion 116 of article holder 22 to mounting fixtures 120, 121 appended to one of left side wall 24 or right side wall 26. It is within the scope of this disclosure to vary the shape of article holder 22 and the location of mounting fixtures 120, 121 to allow article holder 22 to be mounted to child seat 10 alongside right side wall 26.

Article-receiving portion 114 includes a back mounting wall 122 and an outer retaining wall 124 extending about the perimeter of article-receiving portion 114 as shown in FIG. 6. Back mounting wall 122 is appended to mounting portion 116 and outer retaining wall 124. In the illustrated embodiment, back mounting wall 122 extends along outer panel 212 of left side wall 24 between a back mounting wall first end 126 and a back mounting wall second end 128. Outer retaining wall 124 extends around article-receiving cavity 112 and cup-receiving cavity 114 between back mounting wall first end 126 and back mounting wall second end 128.

Figure 8:
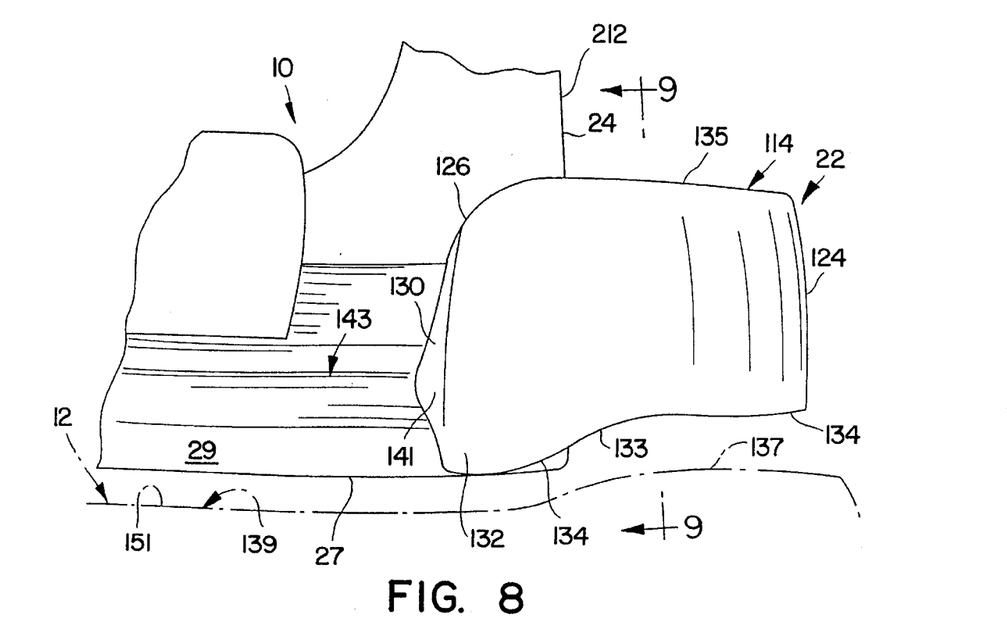
FIG. 8 is a front elevational view of the child seat of FIG. 1, with portions broken away, placed in a vehicle bucket seat (shown in phantom) showing the article holder having an elevated curved bottom edge to compensate for a raised edge formed (shown in phantom) on the vehicle bucket seat; and, FIG. 9 is a sectional view taken along line 9—9 of FIG. 8 showing how the inclined bottom walls of the cup-receiving cavity and article-receiving cavity compensate for the angle of the vehicle seat bottom cushion to provide a level surface for cups, bottles, and juice boxes to be placed.

Back mounting wall first end 126 includes a flared portion 130 that has a curved contour for aesthetic purposes so that article holder 22 will conform to a front corner portion 33 of child seat 10 as shown in FIGS. 1 and 6. Flared portion 130 includes a downwardly extending section 132 so that bottom side 27 of child seat 22 and bottom side 134 of article holder 22 are at the same elevation at front side 29 of child seat 10. Bottom side 134 of article holder 22 raises in elevation relative to bottom side 27 of child seat 10 as article holder 22 extends from front side 29 toward back side 31 of child seat 10. As shown in FIG. 3, bottom side 134 of article holder 22 is elevated a distance 136 above bottom side 27 of child seat 10. Bottom side 134 of article holder 22 is elevated to compensate for raised edge 137 commonly found in a vehicle bucket seat 139 as shown in FIG. 8. Raised edge 137 is an upwardly-facing convex surface and article holder 22 includes a downwardly-facing concave surface 133 on bottom side 134 that generally follows the contour of the raised edge 137. Article holder 22 will also fit onto and function on a vehicle bench seat (not shown) because raised edge 137 of vehicle bucket seat 139 is not needed to support article holder 22. In preferred embodiments of the present invention, distance 136 is approximately one-third to one-half of an inch.

Figure 9:
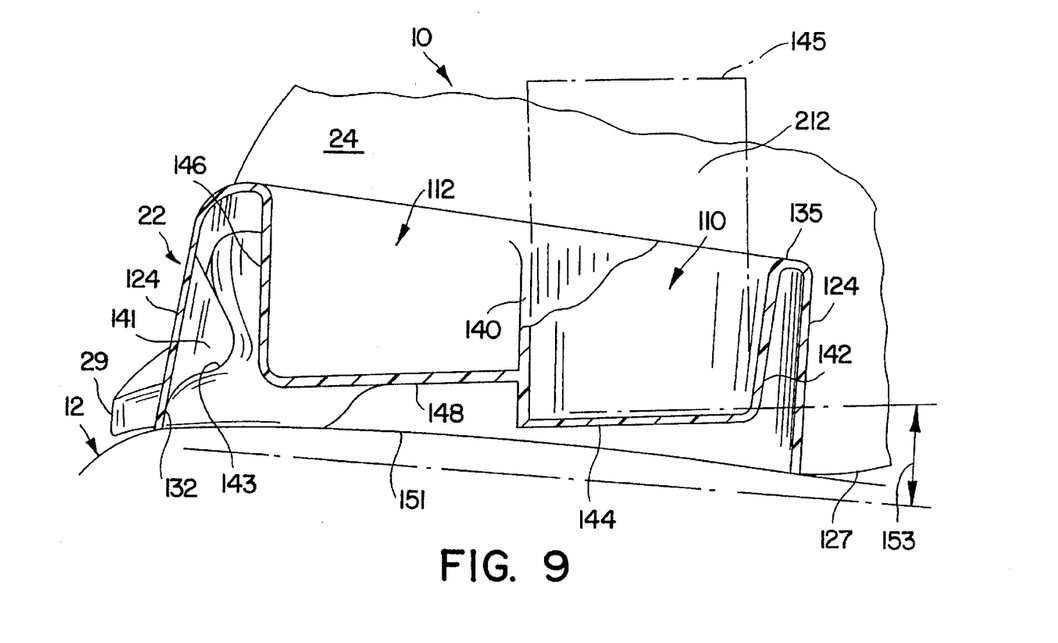

Flared portion 130 also includes a triangularly-shaped portion 141 extending from back mounting wall first end 126 toward back mounting wall second end 128 almost parallel to back mounting wall 122. Triangularly-shaped portion 141 extends into a groove 143 formed in front side 29 and adjacent to bottom side 27 of child seat 10 as shown in FIGS. 8 and 9. Outer retaining wall 124 also has a curved contour for aesthetic purposes as shown in FIGS. 1, 2, and 6.

Cup-receiving cavity 110 is substantially circular in shape as shown in FIGS. 1, 2, and 6. A handle-receiving slot 138 is formed in outer retaining wall 124 adjacent to cup-receiving cavity 110 so that cups having handles may fit within cup-receiving cavity 110. Rectangularly-shaped juice boxes (not shown) are very popular with parents and young children. Cup-receiving cavity 110 is sized to receive a juice box. Article-receiving cavity 112 is triangularly shaped as shown in FIGS. 1, 2, and 6. An interconnecting wall 140 extends between back mounting wall 122 and outer retaining wall 124 separating cup-receiving cavity 110 and article-receiving cavity 112.

Cup-receiving cavity 110 includes a cup-receiving cavity side wall 142 and a cup-receiving cavity bottom wall 144. Cup-receiving cavity side wall 142 includes a handle-receiving slot 149 similar to handle-receiving slot 138 of outer retaining wall 124 so that cups with handles may fit within cup-receiving cavity 110. Article-receiving cavity 112 includes an article-receiving cavity side wall 146 and an article-receiving cavity bottom wall 148. Both side walls 142, 146 are integral with portions of interconnecting wall 140 and back mounting wall 122 and are spaced apart from all of outer retaining wall 124.

Figure 7:
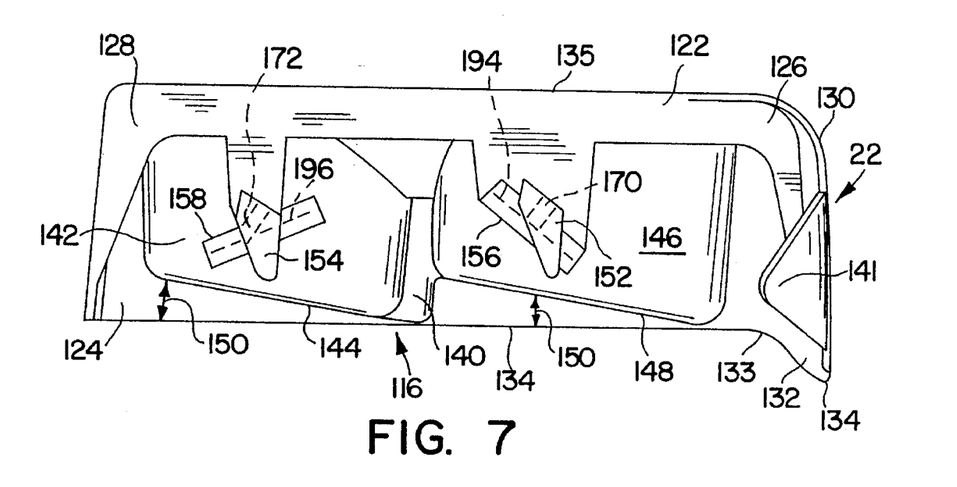
FIG. 7 is a back elevational view of the article holder taken along line 7—7 of FIG. 2 showing the spaced-apart mounting brackets appended to a back mounting wall of the article holder and the cup-receiving cavity and article-receiving cavity having inclined bottom walls to compensate for the incline of a typical car seat.

Both bottom walls 144, 148 are inclined at an angle 150 relative to bottom side 134 and top side 135 of article holder 22 as shown in FIG. 7. Bottom walls 144, 148 are inclined to compensate for the angle 153 of the bottom cushion 151 of vehicle seat 12 which child seat 10 will occupy as shown in FIG. 9. Typical vehicle seat bottom cushions 151 are angled approximately 10° to 15° in both vehicle bucket seats 139 and vehicle bench seats (not shown) for vehicle passenger comfort. When child seat 10 with article holder 22 is placed in vehicle seat 12, bottom walls 144, 148 are level with respect to the road on which the vehicle is travelling. This helps prevent liquid from spilling out of a cup 145 placed in article holder 22.

Mounting portion 116 includes first and second mounting brackets 152, 154 and first and second mounting bracket supports 156, 158 appended to back mounting wall 122 as shown in FIGS. 4 and 7. Each mounting bracket support 156, 158 extends through side access port 216 and under bottom edge 186 of outer panel 212 and includes a first end 166 appended to back mounting wall 122 and a second end 168 appended to mounting brackets 152, 154 as shown in FIG. 4. Mounting brackets 152, 154 extend through side access port 216 into downwardly-opening, article holder-receiving mounting chamber 178 to lie above bottom edge 186 of outer panel 212 as shown, for example, in FIGS. 3–5.

Mounting brackets 152, 154 are each formed to include an aperture 170, 172 through which fasteners 118 extend. Aperture 170 is formed along axis 174 and aperture 172 is formed along axis 176 so that fasteners 118 may extend from fastener receivers 160, 162 into mounting fixtures 120, 121 to connect article holder 22 and child seat 12 as shown in FIGS. 3–5. In the illustrated embodiment of the present invention, fasteners 118 are screws. In alternative embodiments of the present invention, the fasteners may be any device that connect article holder 22 and child seat 10.

Downwardly-opening, article holder-receiving mounting chamber 178 is formed in child seat 10 in between left side wall 24 and seating unit 16 as shown in FIGS. 3 and 4. In alternative embodiments of the present invention, the mounting chamber may be formed in between the right side wall and the seating unit.

Mounting fixtures 120, 121 are situated within the downwardly-opening, article holder-receiving mounting chamber 178 formed in child seat 10 as shown in FIGS. 3 and 4. Mounting fixtures 120, 121 are spaced-apart and each include a cylindrically-shaped finger 179, 181 as shown in FIGS. 3–5. Each finger 179, 181 includes a first end 188 appended to left side wall 24 within article holder-receiving mounting chamber 178 and a second end 190 situated within article holder-receiving mounting chamber 178 and spaced apart from left side wall 24. Each mounting fixture 120, 121 further includes a rib 192 appended to left side wall 24 and a portion of fingers 179, 181 between first end 188 and second end 190.

Each finger 179, 181 is formed to include a longitudinally-extending channel 180, 182 for receiving fasteners 118. Channel 180 extends along axis 174 and channel 182 extends along axis 176 so that fasteners 118 may extend from apertures 170, 172 formed in mounting brackets 152, 154 into channels 180, 182 formed in mounting fixture fingers 179, 181 adjacent to side access port 216 as shown, for example, in FIGS. 2–5.

Bottom edge 186 of outer panel 212 of left side wall 24 overhangs and hides mounting fixtures 120, 121. Bottom edge 186 has a curved contour for aesthetic purposes.

Mounting brackets 152, 154 are situated to lie within article holder-receiving mounting chamber 178 and above bottom edge 186 so that bottom edge 186 is situated in between mounting bracket supports 156, 158 and back mounting wall 122 as shown in FIG. 5. Mounting bracket supports 156, 158 are formed to include channels 194, 196 that engage bottom edge 186 of left side wall 24 as shown in FIG. 4. More specifically, bottom edge 186 of left side wall 24 is positioned in between channels 194, 196 and back mounting wall 122 of article holder 22.

Side-mounted article holder 22 provides a convenient location for caregivers and young children to place cups, bottles, juice boxes, and miscellaneous items. Child seat 10 with article holder 22 attached can be moved between seats in a vehicle and between vehicles.

The mounting location between article holder 22 and child seat 10 is hidden within article holder-receiving mounting chamber 178 above bottom edge 186 of left side wall 24 so that child seat 10 retains its pleasing aesthetic appearance when article holder 22 is not attached to child seat 10. The hidden mounting location also helps the aesthetic appearance of child seat 10 when article holder 22 is mounted on child seat 10 because connectors 118 are hidden within mounting chamber 178. Article holder 22 is contoured to allow it to conform in an aesthetically pleasing manner with child seat 10. Further, article holder 22 includes features that permit child seat 10 with side-mounted article holder 22 to fit into a vehicle bucket seat 139 or bench seat (not shown).

Although the invention has been described in detail with reference to certain preferred embodiments, variations and modifications exist within the scope and spirit of the invention as described and defined in the following claims.

I claim:

1. A child seat comprising a seat including a left side wall, a right side wall positioned to lie in spaced-apart relation to the left side wall, and a seat bottom therebetween, one of the left and right side walls including an inner panel abutting the seat bottom, an outer panel spaced apart from and connected to the inner panel, and a downwardly-opening, article holder-receiving mounting chamber defined between the inner panel and outer panel, the inner panel having a bottom edge and the outer panel having a bottom edge that is vertically spaced from the bottom edge of the inner panel to define a side access port into the downwardly-opening, article holder-receiving mounting chamber, an article holder, and means for detachably connecting the article holder to the seat to position the article holder adjacent to the side access port.

2. The child seat of claim 1, further comprising a mounting fixture situated within the downwardly-opening, article holder mounting chamber, the mounting fixture is formed to include a longitudinally-extending channel, and the connector extends into the longitudinally-extending channel of the mounting fixture adjacent to the side access port.

3. The child seat of claim 1, wherein the bottom edge of the outer panel has a curved contour to define the side access port.

4. A child seat comprising a seat including a left side wall, a right side wall positioned to lie in spaced-apart relation to the left side wall, and a seat bottom therebetween, and an article holder mounted to the seat along one of the left and right side walls, wherein the seat bottom includes an upwardly-facing, child-receiving seating surface, the left side wall is formed to include a downwardly-opening, article holder-receiving mounting chamber, and the article holder includes an article-receiving portion formed to include a first cavity configured to receive a cup therein, a mounting portion appended to the article-receiving portion and positioned to lie in the downwardly opening, article holder-receiving mounting chamber formed in the left side wall, and a connector coupled to the left side wall and the mounting portion and positioned to lie in the downwardly opening, article holder-receiving mounting chamber formed in the left side wall.

5. The child seat of claim 4, wherein the article-receiving portion is also formed to include a second cavity configured to receive articles therein.

6. A child seat comprising a seat including a left side wall, a right side wall positioned to lie in spaced-apart relation to the left side wall, and a seat bottom therebetween, and an article holder mounted to the seat along one of the left and right side walls, wherein the seat bottom includes an upwardly-facing, child-receiving, seating surface, the right side wall is formed to include a downwardly-opening article holder mounting chamber, and the article holder includes an article-receiving portion formed to include a first cavity configured to receive a cup therein, a mounting portion appended to the article-receiving portion and positioned to lie in the downwardly-opening, article holder-receiving mounting chamber formed in the right side wall, and a connector coupled to the right side wall and the mounting portion and positioned to lie in the downwardly-opening article holder-receiving mounting chamber formed in the right side wall.

7. The child seat of claim 6, wherein the article-receiving portion is also formed to include a second cavity configured to receive articles therein.

8. The child seat of claim 6, further comprising a movable shield including a left wing engaging the left side wall, a right wing engaging the right side wall, and a barrier positioned to lie between the left and right wings and above the seat bottom and the article holder is mounted to the seat in a position adjacent to the seat bottom and below the movable shield.

9. A child seat comprising
a seat including a left side wall, a right side wall positioned to lie in spaced-apart relation to the left side wall, and a seat bottom therebetween, one of the left and right side walls including an inner panel abutting the seat bottom, an outer panel spaced apart from and connected to the inner panel, and downwardly-opening, article holder-receiving mounting chamber defined between the inner panel and outer panel,
an article holder including an article-receiving portion and a mounting portion situated in the downwardly-opening, article holder-receiving mounting chamber, and
a connector releasably coupled to the mounting portion of the article holder and the seat to position the article holder adjacent to the seat along one of the left and right side walls.

10. The child seat of claim 9, wherein the article-receiving portion includes a back mounting wall situated adjacent to the outer panel and arranged to extend from a back mounting wall first end to a back mounting wall second end and an outer retaining wall extending from the back mounting wall first end to the back mounting wall second end.

11. The child seat of claim 10, wherein the mounting portion is appended to the back mounting wall.

12. The child seat of claim 10, wherein the article-receiving portion further includes an article-receiving cavity formed within the back mounting wall and outer retaining wall.

13. The child seat of claim 12, wherein the article-receiving portion further includes a cup-receiving cavity formed within the back mounting wall and outer retaining wall and the article-receiving portion includes an interconnecting wall extending between the back mounting wall and outer retaining wall.

14. The child seat of claim 13, wherein the interconnecting wall is situated in between the cup-receiving cavity and article-receiving cavity.

15. The child seat of claim 10, further comprising a front side and the first end of the back mounting wall includes a flared portion having a curved section adjacent to the front side.

16. The child seat of claim 15, further comprising a bottom side and the flared portion includes a downwardly extending portion that is flush with the bottom side.

17. The child seat of claim 10, wherein the article-receiving cavity further includes a cup-receiving cavity formed in between the back mounting wall and outer retaining wall.

18. The child seat of claim 17, wherein an article-receiving cavity is formed in between the back mounting wall and outer retaining wall.

19. The child seat of claim 17, wherein the outer retaining wall is formed to include a handle-receiving slot adjacent to the cup-receiving cavity.

20. The child seat of claim 17, wherein the article holder includes a top side, the cup-receiving cavity includes a side wall and a bottom wall, and the bottom wall is inclined relative to the top side.

21. The child seat of claim 17, wherein the article holder includes a bottom side, the cup-receiving cavity includes a side wall and a bottom wall, and the bottom wall is inclined relative to the bottom side.

22. The child seat of claim 9, wherein the article holder mounting chamber is formed in the left side wall.

23. The child seat of claim 9, further comprising a mounting fixture situated within the downwardly-opening, article holder mounting chamber and the connector is coupled to the mounting portion of the article holder and the mounting fixture, the mounting fixture is formed to include a longitudinally-extending channel, and the connector extends into the longitudinally-extending channel of the mounting fixture.

24. The child seat of claim 7, wherein the outer panel includes a bottom edge having a curved contour.

25. The child seat of claim 24, wherein the article-receiving portion includes a back mounting wall situated adjacent to the outer panel, the mounting portion includes a mounting bracket appended to the back mounting wall, and the mounting bracket extends into the downwardly-opening, article holder mounting chamber and is situated to lie above the bottom edge of the outer panel.

26. The child seat of claim 25, wherein the mounting portion further includes a mounting bracket support having a first end appended to the back mounting wall and a second end appended to the mounting bracket, the mounting bracket support extends between the back mounting wall and the mounting bracket under the bottom edge of the outer panel, the mounting bracket is formed to include a connector-receiving aperture, and the connector extends through the connector-receiving aperture.

27. The child seat of claim 9, wherein the article-receiving portion includes a back mounting wall situated adjacent to the outer panel and the mounting portion includes a mounting bracket appended to the back mounting wall and situated to lie between the inner panel and the outer panel in the downwardly-opening, article holder-receiving mounting chamber.

28. The child seat of claim 27, wherein the mounting portion further includes a mounting bracket support having a first end appended to the back mounting wall and a second end appended to the mounting bracket.

29. The child seat of claim 28, wherein the inner panel includes a bottom edge and the outer panel includes a bottom edge situated in between the mounting bracket support and the back mounting wall.

30. The child seat of claim 27, wherein the mounting portion includes a second mounting bracket appended to the back mounting wall.

31. The child seat of claim 9, wherein the article holder includes an article-receiving portion and a mounting portion, the article-receiving portion includes a back mounting wall situated adjacent to the outer panel, the mounting portion includes a mounting bracket appended to the back mounting wall, and the mounting bracket extends through the side access port and into the downwardly-opening, article holder mounting chamber and is situated to lie above the bottom edge of the outer panel.

32. The child seat of claim 31, wherein the mounting portion further includes a mounting bracket support having a first end appended to the back mounting wall and a second end appended to the mounting bracket, the mounting bracket support extends between the back mounting wall and the mounting bracket, under the bottom edge of the outer panel, and through the side access port, the mounting bracket is formed to include a connector-receiving aperture, and the connector extends through the connector-receiving aperture.

33. The child seat of claim 9, wherein the one of the left and right side walls further includes a forwardly-facing panel having a first side connected to the inner panel and a second side connected to the outer panel.

34. The child seat of claim 33, wherein the inner panel includes a top edge, the outer panel includes a top edge, and the forwardly-facing panel is connected to and arranged to extend between the top edges of the inner and outer panels.

35. The child seat of claim 9, wherein the inner panel includes a bottom edge, the outer panel includes a bottom edge that is vertically spaced apart from the bottom edge of the inner panel to define a side access port into the downwardly-opening, article holder-receiving chamber.

36. The child seat of claim 35, wherein the bottom edge of the outer panel is serpentine-shaped relative to the bottom edge of the inner panel.

37. A child seat comprising a seat including a left side wall, a right side wall positioned to lie in spaced-apart relation to the left side wall; and a seat bottom therebetween, one of the left and right side walls including an inner panel abutting the seat bottom, an outer panel spaced apart from the inner panel, and a chamber defined between the inner and outer panels, an article holder having a mounting portion situated within the chamber, and a connector situated within the chamber and releasably coupled to the article holder and the seat to position the article holder adjacent to the seat.

38. The child seat of claim 37 wherein the article holder abuts the outer panel.

39. The child seat of claim 38, wherein the seat further includes a mounting fixture formed in the chamber, the mounting portion of the article holder is situated adjacent to the mounting fixture within the chamber, and the connector couples the mounting portion and the mounting fixture to position the article holder adjacent to the outer panel.

40. The child seat of claim 37, wherein the mounting portion is formed to include a mounting bracket situated within the chamber and the connector couples the mounting bracket to the seat to position the article holder adjacent to the outer panel.

41. The child seat of claim 40, wherein the mounting bracket is formed to include an aperture and the connector extends through the aperture and into the seat to position the article holder adjacent to the outer panel.

42. A child seat comprising a seat including a left side wall, a right side wall positioned to lie in spaced apart relation to the left side wall, and a seat bottom therebetween, one of the left and right side walls including an inner panel abutting the seat bottom, an outer panel spaced apart from and connected to the inner panel, and a downwardly-opening, article holder-receiving mounting chamber defined between the inner panel and outer panel, the one of the left and right side walls being formed to include a wing-receiving slot and a pair of opposing, spaced-apart, post-receiving slots situated between the inner and outer panels, a movable shield including a wing positioned to lie in the wing-receiving slot formed in the one of the left and right side walls, a barrier shield positioned to lie between the wing and the other of the left and right side walls, a pair of pivot posts appended to the wing and arranged to engage the pair of opposing, spaced-apart, post-receiving slots, an article holder including an article-receiving portion and a mounting portion situated to lie in the downwardly-opening, article holder-receiving chamber, and a connector coupled to the mounting portion of the article holder and the seat to detachably mount the article holder adjacent to the seat.

43. The child seat of claim 42, wherein the inner panel includes a bottom edge, the outer panel includes a bottom edge that is vertically spaced from the bottom edge of the inner panel to define a side access port into the downwardly-opening, article holder-receiving mounting chamber.

* * * * *